(12) United States Patent  
Goesnar et al.

(10) Patent No.: US 9,407,869 B2  
(45) Date of Patent: Aug. 2, 2016

(54) SYSTEMS AND METHODS FOR INITIATING CONFERENCES USING EXTERNAL DEVICES

(71) Applicant: Dolby Laboratories Licensing Corporation, San Francisco, CA (US)

(72) Inventors: Erwin Goesnar, Daly City, CA (US); David Gunawan, Baulkham Hills (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/435,698

(22) PCT Filed: Oct. 11, 2013

(86) PCT No.: PCT/US2013/064599  
§ 371 (c)(1),  
(2) Date: Apr. 14, 2015

(87) PCT Pub. No.: WO2014/062509  
PCT Pub. Date: Apr. 24, 2014

(65) Prior Publication Data  
US 2015/0264314 A1 Sep. 17, 2015

Related U.S. Application Data

(60) Provisional application No. 61/715,673, filed on Oct. 18, 2012, provisional application No. 61/732,568, filed on Dec. 3, 2012.

(51) Int. Cl.  
*H04N 7/15* (2006.01)  
*H04L 12/18* (2006.01)  
*H04B 11/00* (2006.01)

(52) U.S. Cl.  
CPC ............. *H04N 7/15* (2013.01); *H04B 11/00* (2013.01); *H04L 12/1818* (2013.01); *H04L 12/1827* (2013.01)

(58) Field of Classification Search  
CPC  H04B 11/00; H04L 12/1818; H04L 12/1827; H04N 7/15  
See application file for complete search history.

(56) References Cited

U.S. PATENT DOCUMENTS 4,580,250 A  4/1986 Kago  
5,742,688 A  4/1998 Ogawa  
(Continued)

FOREIGN PATENT DOCUMENTS

EP  1737271  12/2006  
WO  2011/117563  9/2011

OTHER PUBLICATIONS

Pengfei, C. et al "Research and Solutions of Sidebar Media Control in Centralized Conferencing Framework" IEEE Conference publications, Broadband Network & Multimedia Technology, 2009, pp. 565-569.

(Continued)

*Primary Examiner* — Stella L Woo

(57) ABSTRACT

A system and method for initiating conference calls with external devices are disclosed. Call participants are sent conference invitation and conference information regarding the designated conference call. This conference information is stored on the participant's external device. When the participants arrive at a conference call location having a conferencing device, the conferencing device is capable of communicating with the external device, initiating communications, exchanging conference information. If the participant is verified and/or authorized, the conference system may send the IP address of the conference device to the conference system to initiate the conference call. In one embodiment, the conference device uses an ultrasound acoustic communication band to initiate the call with the external device on a semi-automated basis. An acoustic signature comprising a pilot sequence for communications synchronization may be generated to facilitate the call. Audible and aesthetic acoustic protocols may also be employed.

42 Claims, 8 Drawing Sheets

(56) References Cited

U.S. PATENT DOCUMENTS

| | | | |
|---|---|---|---|
| 6,127,617 A | 10/2000 | Suzuki | |
| 6,553,122 B1 | 4/2003 | Shimauchi | |
| 6,607,136 B1* | 8/2003 | Atsmon | G06F 21/34 235/487 |
| 6,628,787 B1 | 9/2003 | McGrath | |
| 6,910,129 B1* | 6/2005 | Deng | G07C 9/00158 380/30 |
| 6,957,185 B1 | 10/2005 | Labaton | |
| 7,003,467 B1 | 2/2006 | Smith | |
| 7,162,045 B1 | 1/2007 | Fujii | |
| 7,260,221 B1 | 8/2007 | Atsmon | |
| 7,450,149 B2 | 11/2008 | Drell | |
| 7,480,259 B2 | 1/2009 | Covell | |
| 7,480,692 B2 | 1/2009 | Atsmon | |
| 7,483,526 B2 | 1/2009 | Keohane | |
| 7,508,412 B2 | 3/2009 | Liu | |
| 7,522,181 B2 | 4/2009 | Wilson, Jr. | |
| 7,567,662 B1 | 7/2009 | Renner | |
| 7,577,262 B2 | 8/2009 | Kanamori | |
| 7,654,148 B2 | 2/2010 | Tomlinson, Jr. | |
| 7,660,424 B2 | 2/2010 | Davis | |
| 7,679,638 B2 | 3/2010 | Eshkoli | |
| 7,679,640 B2 | 3/2010 | Eshkoli | |
| 7,693,534 B1 | 4/2010 | Lundy | |
| 7,751,347 B2 | 7/2010 | Giroti | |
| 7,761,291 B2 | 7/2010 | Renevey | |
| 7,859,483 B2 | 12/2010 | Ueno | |
| 7,933,421 B2 | 4/2011 | Asada | |
| 8,010,604 B2 | 8/2011 | Lapstun | |
| 8,116,442 B2 | 2/2012 | Remaker | |
| 8,180,067 B2 | 5/2012 | Soulodre | |
| 8,189,810 B2 | 5/2012 | Wolff | |
| 8,730,847 B1* | 5/2014 | Carino | H04L 12/1818 370/260 |
| 2002/0113687 A1* | 8/2002 | Center, Jr. | G06K 9/00221 340/5.82 |
| 2004/0172564 A1* | 9/2004 | Federova | G06F 21/36 726/7 |
| 2004/0207719 A1 | 10/2004 | Tervo | |
| 2005/0056692 A1 | 3/2005 | Paul | |
| 2005/0213735 A1* | 9/2005 | Rodman | H04B 1/40 379/202.01 |
| 2005/0259803 A1 | 11/2005 | Khartabil | |
| 2006/0059001 A1 | 3/2006 | Ko | |
| 2007/0111716 A1 | 5/2007 | Leigh | |
| 2007/0276908 A1 | 11/2007 | Asthana | |
| 2008/0069011 A1 | 3/2008 | Sekaran | |
| 2008/0129816 A1 | 6/2008 | Mattila | |
| 2009/0054107 A1 | 2/2009 | Feland, III | |
| 2009/0116652 A1 | 5/2009 | Kirkeby | |
| 2009/0228321 A1 | 9/2009 | Srinivasan | |
| 2009/0232291 A1 | 9/2009 | Prabhune | |
| 2009/0238383 A1 | 9/2009 | Meyer | |
| 2009/0240770 A1 | 9/2009 | Kalipatnapu | |
| 2009/0279715 A1 | 11/2009 | Jeong | |
| 2010/0167710 A1 | 7/2010 | Alhainen | |
| 2010/0189244 A1 | 7/2010 | Sastry | |
| 2010/0189274 A1 | 7/2010 | Thaden | |
| 2010/0220634 A1 | 9/2010 | Gisby | |
| 2010/0220845 A1 | 9/2010 | Oliver | |
| 2010/0226454 A1* | 9/2010 | Bliss | H04L 27/2655 375/267 |
| 2010/0241845 A1 | 9/2010 | Alonso | |
| 2011/0028136 A1 | 2/2011 | Frazier | |
| 2011/0029370 A1* | 2/2011 | Roeding | G06Q 30/00 705/14.38 |
| 2011/0033033 A1 | 2/2011 | Koul | |
| 2011/0123010 A1 | 5/2011 | Shan | |
| 2011/0135077 A1 | 6/2011 | Wengrovitz | |
| 2011/0150199 A1 | 6/2011 | Gisby | |
| 2011/0249086 A1 | 10/2011 | Guo | |
| 2011/0252090 A1 | 10/2011 | Garcia, Jr. | |
| 2011/0271192 A1 | 11/2011 | Jones | |
| 2011/0271210 A1 | 11/2011 | Jones | |
| 2011/0276901 A1 | 11/2011 | Zambetti | |
| 2011/0293103 A1 | 12/2011 | Park | |
| 2011/0305332 A1 | 12/2011 | Geppert | |
| 2011/0317593 A1 | 12/2011 | Bonkowski | |
| 2012/0058754 A1 | 3/2012 | Couse | |
| 2012/0072505 A1 | 3/2012 | Patil | |
| 2012/0076308 A1 | 3/2012 | Kuech | |
| 2012/0128146 A1 | 5/2012 | Boss | |
| 2012/0185291 A1* | 7/2012 | Ramaswamy | G06Q 10/1095 705/7.19 |
| 2012/0311623 A1* | 12/2012 | Davis | H04N 5/765 725/18 |
| 2013/0106977 A1* | 5/2013 | Chu | H04N 7/142 348/14.02 |
| 2014/0005812 A1* | 1/2014 | Gu | G06Q 30/02 700/94 |

OTHER PUBLICATIONS

Haas, Helmut "The Influence of a Single Echo on the Audibility of Speech" JAES vol. 20, Issue 2, pp. 146-159, Mar. 1972.

James B. ST et al "Corpuscular Streaming and Parametric Modification Paradigm for Spatial Audio Teleconferencing" May 7 and Sep. 29, 2008, J. Audio Eng. Soc. vol. 56, No. 10 Department of Computing and Electronic Systems.

Excell, David "Reproduction of a 3D Sound Field Using an Array of Loudspeakers", Thesis, Jun. 2003.

Gunawan, D. "Musical Instrument Sound Source Separation", Ph.D Thesis, The University of New South Wales, 2009.

Every, M.R. Separation of Musical Sources and Structure from Single-Channel Polyphonic Recordings, Ph.D. Thesis, University of York, 2006.

Klapuri, A. "Signal Processing Methods for the Automatic Transcription of Music" Ph.D. Thesis, Tampere University of Technology, 2004.

* cited by examiner

SYSTEMS AND METHODS FOR INITIATING CONFERENCES USING EXTERNAL DEVICES

CROSS REFERENCE TO RELATED APPLICATIONS

This application claims priority to United States Provisional Patent Application 61/715,673, filed on 18 Oct. 2012 and U.S. Provisional Patent Application No. 61/732,568 filed on 3 Dec. 2012, both of which are hereby incorporated herein by reference in entirety for all purposes.

TECHNICAL FIELD

The present invention relates to conference systems and, more particularly, to systems and methods for initiating conferences employing external devices.

BACKGROUND

In a typical video/voice conference call scenario, it may be the case that one or more conference invitees have the conference bridge information available on a smart phone, tablet, laptop or some other communication/computing device. To initiate the conference, one or more invitees manually enter this information into a speakerphone or some other communication device (or computing device with some means to affect communications—e.g., a laptop with Skype or other communications app).

While this method of initiating and/or connecting to a conference call works, it is not necessarily the fastest or most convenient user experience possible.

SUMMARY

Several embodiments of initiating a conference call are herein disclosed. Call participants are sent conference invitation and conference information regarding the designated conference call. This conference information is stored on the participant's external device. The conference system comprises a processor, a conferencing device, a transceiver. When the participants arrive at a conference call location having a conferencing device, the conferencing device is capable of communicating with the external device, initiating communications, exchanging conference information. If the participant is verified and/or authorized, the conference device may accept command from the external device to initiate the conference call from the conference device. In one embodiment, the conference device uses an ultrasound acoustic communication band to initiate the call with the external device on a semi-automated basis. An acoustic signature comprising a pilot sequence for communications synchronization may be generated to facilitate the call.

In one embodiment, a conferencing system is disclosed that is capable of initiating conference calls with external devices, where external devices may be storing conference information with which invitees to a conference call may authenticate, initiate and sustain a conference call, said conferencing system comprising: a processor capable of generating conference information, said conference information further comprising data for the authentication and initiation of a conference call by conference participants; a conferencing device, said conferencing device capable of receiving from, and transmitting to, conference call data between conference participants; a transceiver for receiving and transmitting conference information between said external devices and said conference system; and further wherein said conferencing system is capable of receiving and transmitting conference information to said external devices in order to initiate a conference call.

Other embodiments may include a method for initiating a conference call between a conferencing system and one or more external devices, said conference system comprising a processor, a conferencing device, a transceiver and further wherein said transceiver is capable of communicating with said external devices over a communication pathway and sending and receiving conference information, the steps of said method comprising: sending conference information to said external devices in advance of a designated conference call; initiating a broadcast signal within proximity to said external devices; generating a pilot sequence; transmitting said pilot sequence for synchronizing said communication with said external devices; receiving conference information from said external devices, said conference information comprising an address regarding said designated conference call; and sending the address of the conferencing device to said conferencing system.

In yet other embodiments, the method includes steps for generating an acoustic signature, the step of generating an acoustic signature further comprises the steps of: generating a pilot sequence; pulse shaping said pilot sequence; coding a data bit stream; pulse shaping said data bit stream; appending said pilot sequence at the beginning of a transmission to said external devices; modulating said appended bit stream with an ultrasonic carrier frequency; and transmitting said modulated bit stream to said external devices.

In yet another embodiment, a method using an external device to initiate a conference call on a conferencing device, includes the steps of: receiving by the external device over an ultrasonic acoustic protocol an acoustic signal transmitted by the conferencing device; decoding the acoustic signal using a processor on the external device to determine first information related to the conferencing device; and using the first information, transmitting to the conferencing device conference information to initiate a conference call.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

Figure 1:
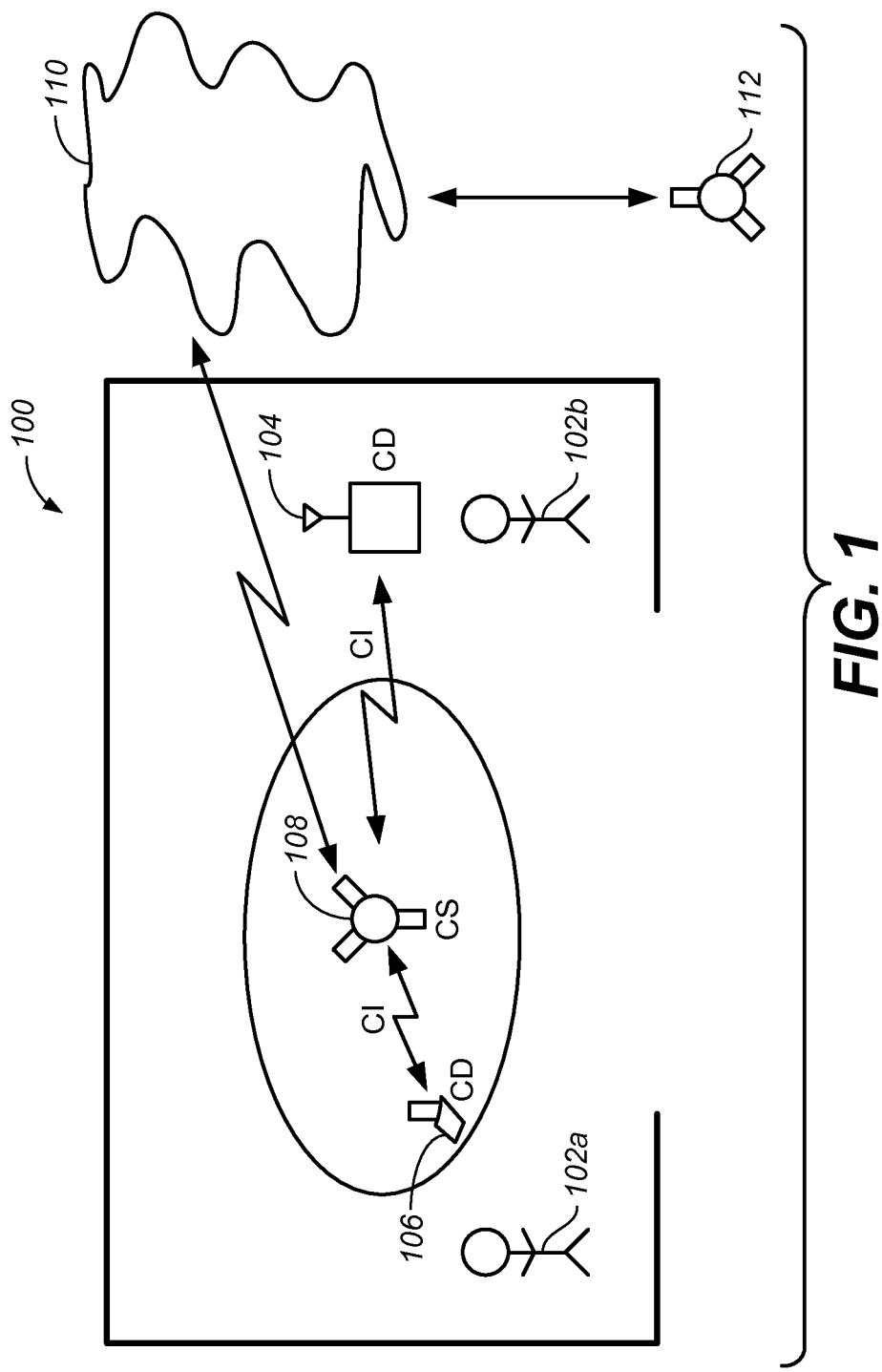
FIG. 1 depicts one possible environment in which a video/voice conferencing system made in accordance with the principles of the present application might operate.

FIG. 1 depicts one possible environment and/or scenario (100) for the initiation of a video/voice conference call—to illustrate various aspects of the present application. In this scenario, call participants and/or invitees 102*a* and 102*b* are in a conference room 100. Invitee 102*a* has a laptop 106, on which the conference bridge information has been stored (e.g., from an email, IM or any other messaging protocol). Invitee 102*b* has a smart phone 104, on which the conference bridge information is similarly stored.

A communications device 108 (e.g., a speakerphone, a laptop, a desktop and the like—any device that would have sufficient processing and/or communications modules to initiate and/or facilitate a conference call) is in the room with the invitees. As mentioned above, the typical and conventional way to initiate a call would be for one of the invitees to manually enter in the conference information into the communication device 108. The communication device—which acts as an end point in the conference may be termed a Conferencing System (CS). The smart phone, tablet, laptop or any external device which may connect to the CS may be termed a Controlling Device (CD). The data pertaining to the conference set up information may be termed Conference Information (CI).

The CS may comprise a variety of devices and modules in a variety of configurations and architectures. In one embodiment of a CS, there may be a processor for the generation and dissemination of CI—as well as aiding in the authentication, initiation and sustainment of a conference call. The CS may also comprise one or more conferencing devices by which the conference audio and/or video signals may be transmitted to the invitees and/or conference participants and shared—in whole or part—among all of the participants in the conference call. The CS may also comprise one or more transceivers (and/or a separate transmitter and receiver—where the term "transceiver" being meant to encompass all combinations thereof) that may allow for communication between the CS and external devices, in order to initiate and/or sustain a conference call—in coordination with external devices, such as CDs. It should be appreciated that the conferencing device and the transceiver may be integral with each other—or, these components may be separate devices in communications with the CS.

In one embodiment, CI may comprise an address for the conference—which may have been sent in a conference call request in an email or other means of inviting a participant to a conference call. Such an address may be embedded e.g., in a URL or some other suitable fashion. As will be described below, if there has been authentication process and the participant with the external device (e.g., CD) may pass the URL through the CS and, the CS may initiate the call from conferencing device using the address provided by the CD.

However, instead of such a manual process, the call may be initiated autonomously or semi-autonomously according to several embodiments of the present application. The smart phone, laptop—or other device having the conference bridge information—may affect communications with the communications device 108 (via any number of known communications protocols—e.g., acoustically, Bluetooth, WiFi, NFC or the like). This communications may thereafter involve connecting with another part of the conference system—e.g., conference system 112. This communications may take place over a plethora of systems and services 110. For example, the call may be affected via the Internet, Plain Old Telephone Service (POTS), or any other combination of wired and wireless communication means. The CS may also comprise sufficient processing power to set up the call, enforce security and limit the participants only to those invited or the like. Such processor and/or processing power may also reside elsewhere in the path of communication—e.g., including the Internet, as an external conference server or the like.

In a call initiation, one embodiment of the present application may have the CD and CS exchange CI over such one or more communications pathway, as is desired. In many embodiments, the data exchanged between the CD and the CS may not be limited only to CI. In one embodiment, data may be exchanged to configure the CS for a specific scenario. For example, invitees may have multiple personalized profiles stored on the CD—which may be downloaded to the CS prior to setting up a call. For merely some examples, configuration may include: microphone/speaker gains, spatial set up, scene configurations or the like.

As will be discussed further herein, there may be a plurality of methods and/or ways to enter into a conference using the CDs. For one embodiment, the CD may comprise an accelerometer and a GPS (or some other proximity indicator/sensor)—and the conference may be initiated with a "bump"—e.g., one person trying to enter a conference may "bump" with a person who is already in the conference and thus, gains entry into the conference.

Example Embodiments

Figure 2:
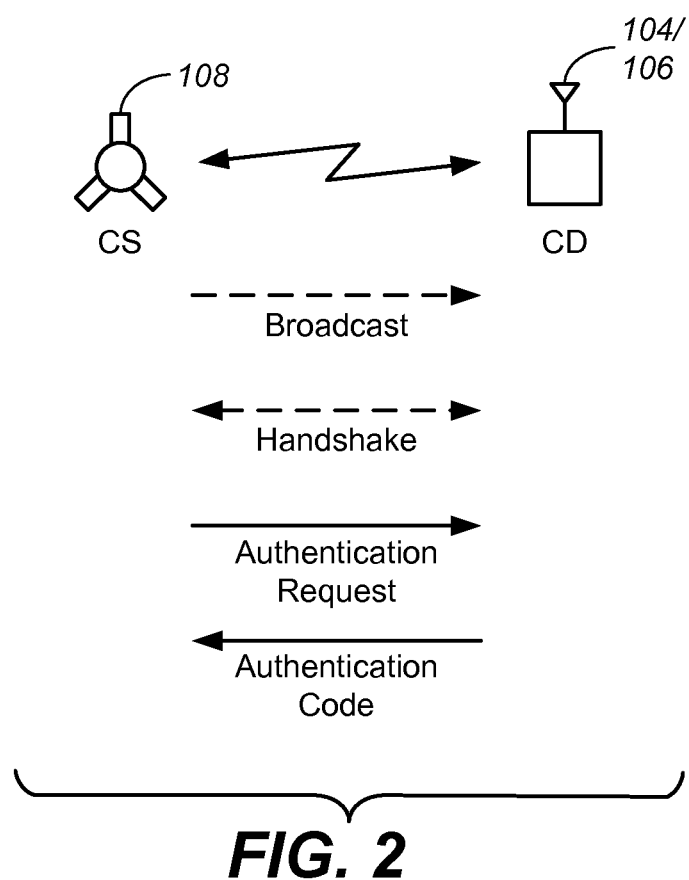
FIG. 2 depicts one embodiment of a conference call initiation as made in accordance with the principles of the present application.

FIG. 2 depicts one embodiment of a CS/CD call initiation sequence that may be possible in accordance with the principles of the present application. CS 108 may be in communications with CD 104/106—e.g., initially by a broadcast message that may be sent by the CD—such broadcast message may be sufficient for one entity to alert the other entity of being in proximity with each other, and allow CD to connect to CS. The broadcast message may contain the IP address of CD and/or Bluetooth address and the authentication code. Of course, such communications pathway may be one of the many wired and/or wireless communications known.

Once the CD is aware of being in proximity with CS, the CD may initiate a connection with CS, and in return the CS may thereafter send out an authentication request—which may ask for an authentication code broadcasted by CS.

If the CS has received proper verification of the authentication code, other information may thereafter be exchanged for the proper initiation of the conference call. For example, an IP address that may be associated with either speakerphone, conferencing device, or the CD may be sent to the CS—in order to properly connect with the other end points in the conference call.

Acoustic Embodiment

It will now be described in greater detail how a CD and a CS may initiate a conference call over an acoustic communications coupling. In the field of acoustics, it is know that the human audio range roughly comprises: (1) infrasonic (from approximately 0-20 Hz) which is generally below the perceptible audio range of humans; (2) audio (from approximately 2-20 k Hz) which is generally the perceptible audio range of humans and (3) ultrasonic (approximately greater than 20 k Hz) which is generally above the audio range of humans.

In one embodiment, the ultrasonic band may be employed (as opposed to the infrasonic and/or audio range) for the ease and comfort of the human invitees to a conference call. In such an embodiment, the CS may use acoustic signals (e.g., the ultrasound band) to send information (e.g., possibly a broadcast message, among other information) about itself to CDs in the line of sound. Those CDs may then connect to the CS using an interface—e.g., WiFi, Bluetooth, Near Field Communication (NFC), acoustic or the like—to exchange CI. In one scenario, an invitee may walk into a conference room with a smart phone, tablet, laptop (or the like) and is able to discover a CS using an acoustic signature and initiate a connection to exchange CI.

In one embodiment, the CS and/or CD may employ a variety of codecs to generate an acoustic signature and decode such signals for data exchange.

Figure 3:
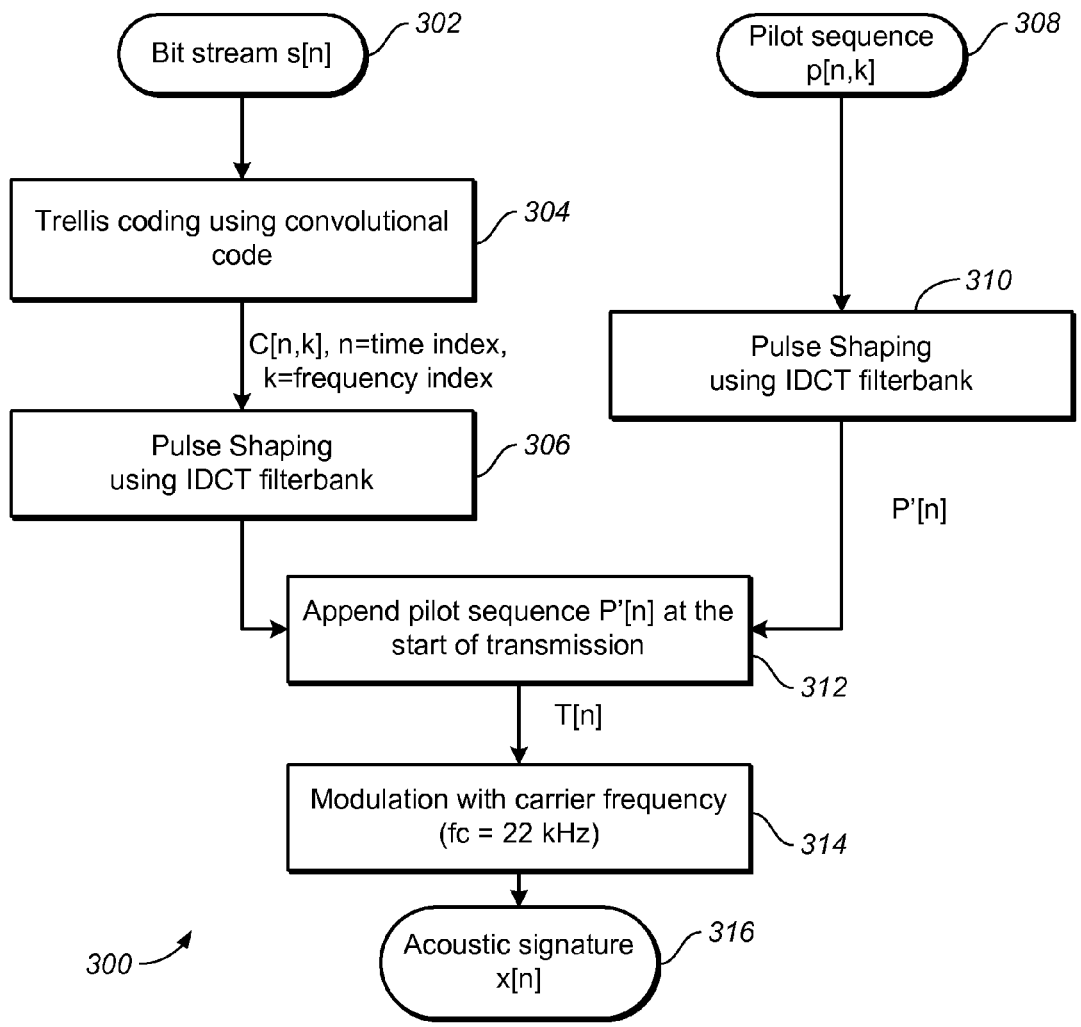
FIG. 3 is one embodiment for the signal flow of the acoustic signal generation.

FIG. 3 is one embodiment for the signal flow 300 of the acoustic generation. As may be seen, a bit stream 302 may be employed to encode data such as CI (e.g., authentication information and IP addresses for call initiation). In addition, a pilot sequence 308 may be employed to provide sufficient synchronization and/or equalization—in either a static or dynamic fashion—for the initiation and/or duration of the conference call.

Bit stream 302 may be encoded using a known scheme—e.g., Trellis coding, possibly using a convolution code—at module 304. The encoded signal may be further pulse shaped at 306, possibly using an Inverse Discrete Cosine Transform (IDCT) module. This shaped signal thereafter may arrive at module 312 to be mixed with the pilot sequence (that may be also pulse shaped at module 310). Mixing module 312 may choose to append the pilot sequence at the start of the transmission in order to—e.g., facilitate the proper synchronization and equalization. The intermediate signal may thereafter be modulated with a carrier acoustic frequency, e.g., in the ultrasonic band, approximately 22 k Hz or higher.

Figure 4:
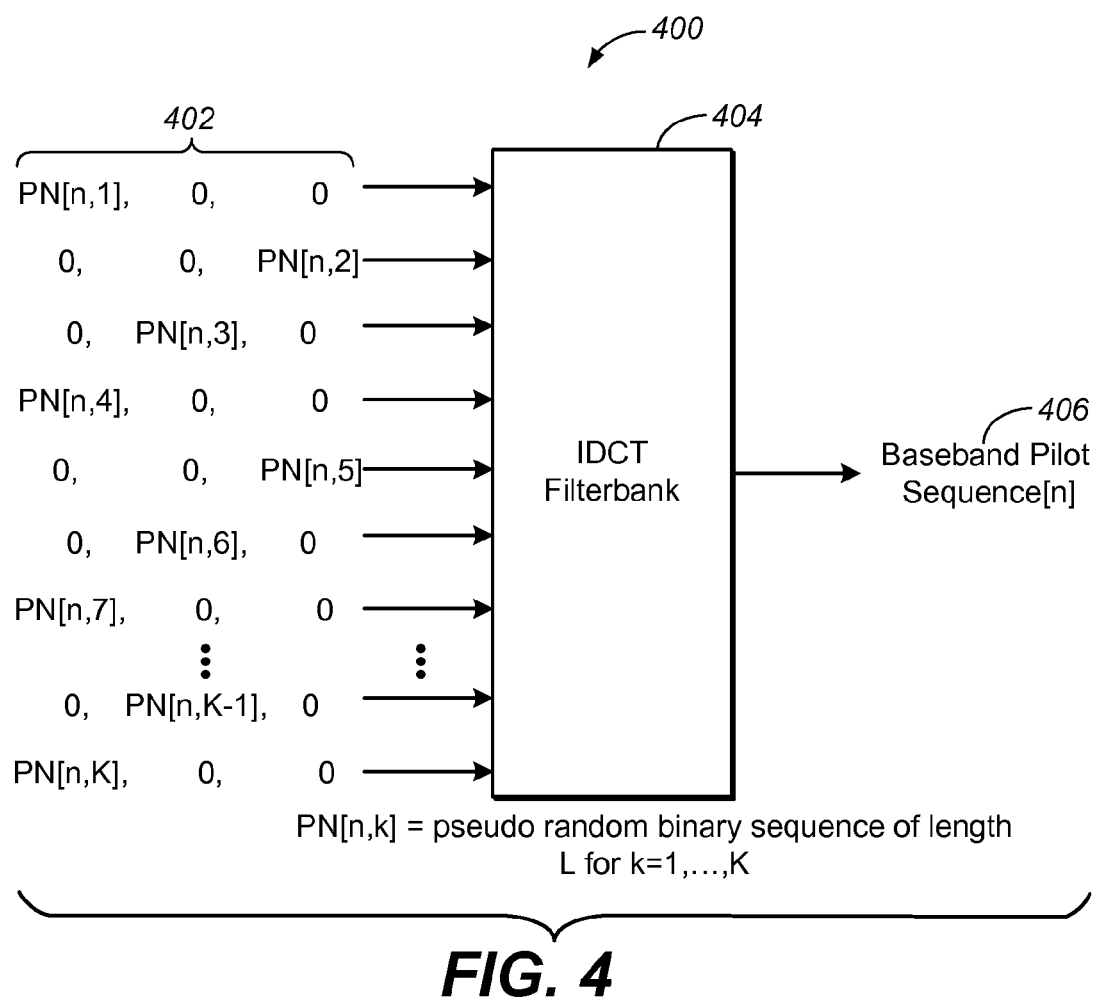
FIG. 4 depicts one possible embodiment of the generation of a pilot sequence.

As discussed above, a pilot sequence may be generated and sent before the bit stream is mixed in to send CI and/or other data/metadata. The decoder of the acoustic signature may use the pilot sequence to search for the start signals—as well as to train the equalizer to improve the bit detections of higher modulation rate. The pilot sequence 402 may be chosen to allow robust detection of the start signal against impairment such as Doppler shift effect and to facilitate the training of the equalizer. A larger frequency spacing of the subcarriers at a given time slot may be used for modulating the pilot sequence—e.g., to reduce the chance of cross-band interference due to Doppler shift. In another embodiment, a convolutional code with a suitable coding rate (e.g., ½) may be used to spread for further mitigating fast fading and Doppler shift. In another embodiment, a DCT-based polyphase filterbank may be used as a pulse shaper to efficiently modulate the signal across multiple frequencies. FIG. 4 depicts one possible embodiment (400) of the generation of a pilot sequence. As may be seen, initial pilot sequence 402 may be input into IDCT filterbank 404—to produce a baseband pilot sequence 406.

Decoder Embodiment

Figure 5:
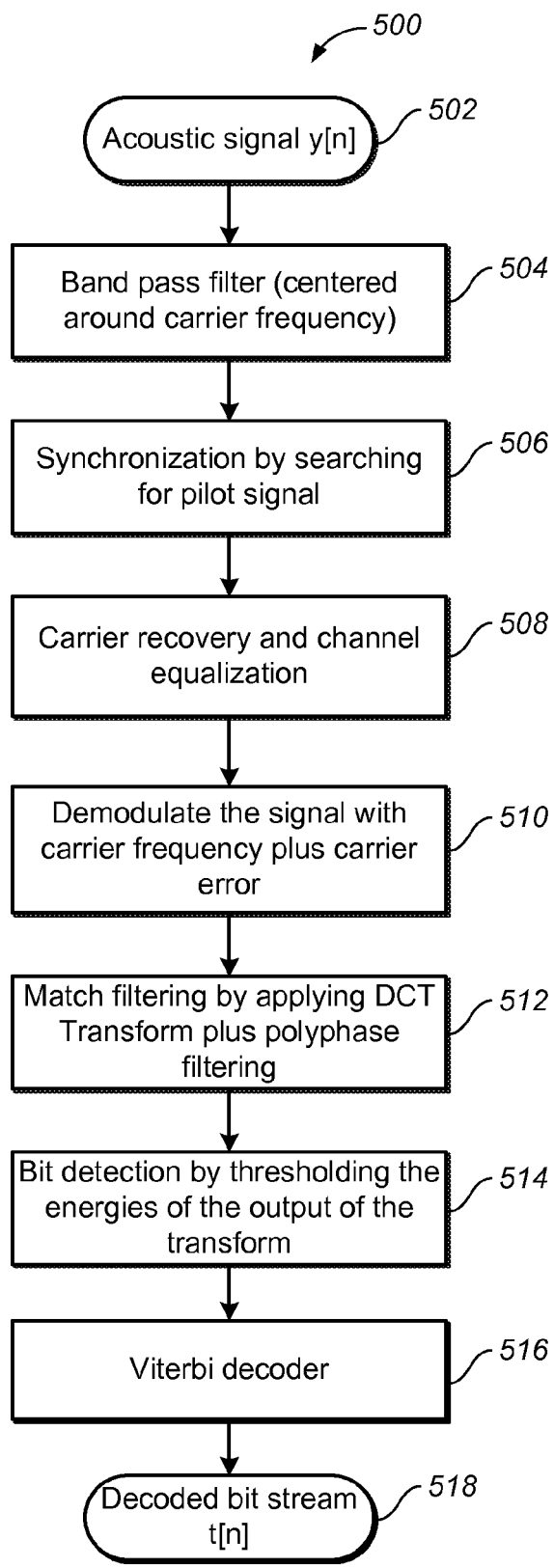
FIG. 5 is one possible embodiment of a decoder and/or decoding process in accordance with the principles of the present application.

At the receiver side, a decoder may keep searching for a pilot signal in e.g., a captured microphone signal. FIG. 5 is one possible embodiment of a decoder (500) as made in accordance with the principles of the present application. At 502, acoustic signal may be acquired by the decoder. This signal may be bandpass filtered (e.g., as centered around the carrier frequency) at 504 and the decoder may search for the pilot signal to provide synchronization at 506. Once the pilot signal is detected, carrier recovery and channel equalization parameters may be updated at 508. The signal may thereafter be demodulated with the carrier frequency plus carrier error at 510. The decoder may then start performing bit detection by thresholding (at 514) the energies of the outputs of match filters (at 512, possibly by applying DCT transform, and/or polyphase filtering) to estimate the trellis coded bits. At 516, a Viterbi decoder may be used to decode the sequence of the estimated bits to obtain the information bits, CI and other data/metadata. It will be appreciated that such a suitable decoder may reside at the CS, CD and/or both the CS and CD.

Figure 6:
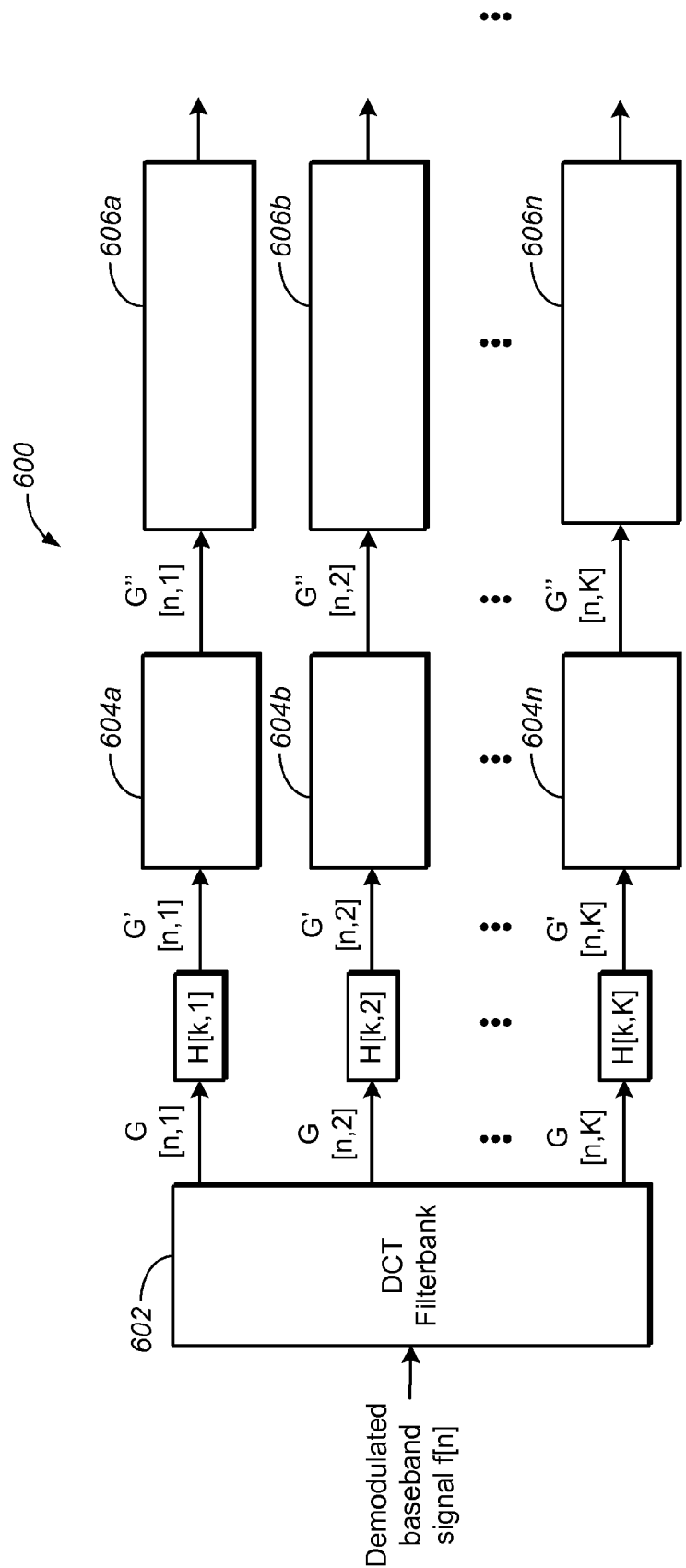
FIG. 6 is one possible embodiment of bit detection module as made in accordance with the principles of the present application.

FIG. 6 is one possible embodiment of bit detection module that may apply a DCT filterbank module 602. The demodulated baseband signal may be input into DCT filterbank 602. This signal is further subdivided into a set—G[n,1] through G[n,K]—which is processed thereafter by a set of processes—H[k,1] through H[k,K]—to produce intermediate G' [n,1] through G' [n,K]. A set of processing modules (604a through 604K) may be applied—via processing units 604k to generate signals:

$$G''[n,k] = \Sigma_{j=0}^{N-1} G'[n-j,k]^2, \text{ for all } k=1 \ldots K.$$

A set of processing modules 606a through 606K may perform a thresholding step, such as, e.g.:

$$b_{est}[n,k] = \begin{cases} 1, & G''[n,k] \geq \text{Threshold} \\ 0, & G''[n,k] < \text{Threshold} \end{cases},$$

for all k=1 ... K and for some suitable Threshold value and where $b_{est}[n, k]$ represents the estimated bit of the received sequence.

Aesthetic Audible Signaling

In another embodiment, a conferencing system (108) may interface to controlling devices (104, 106) through the use of aesthetic audible signaling, such as computer-generated music, which may integrate a meeting identification code (IC).

Figure 7:
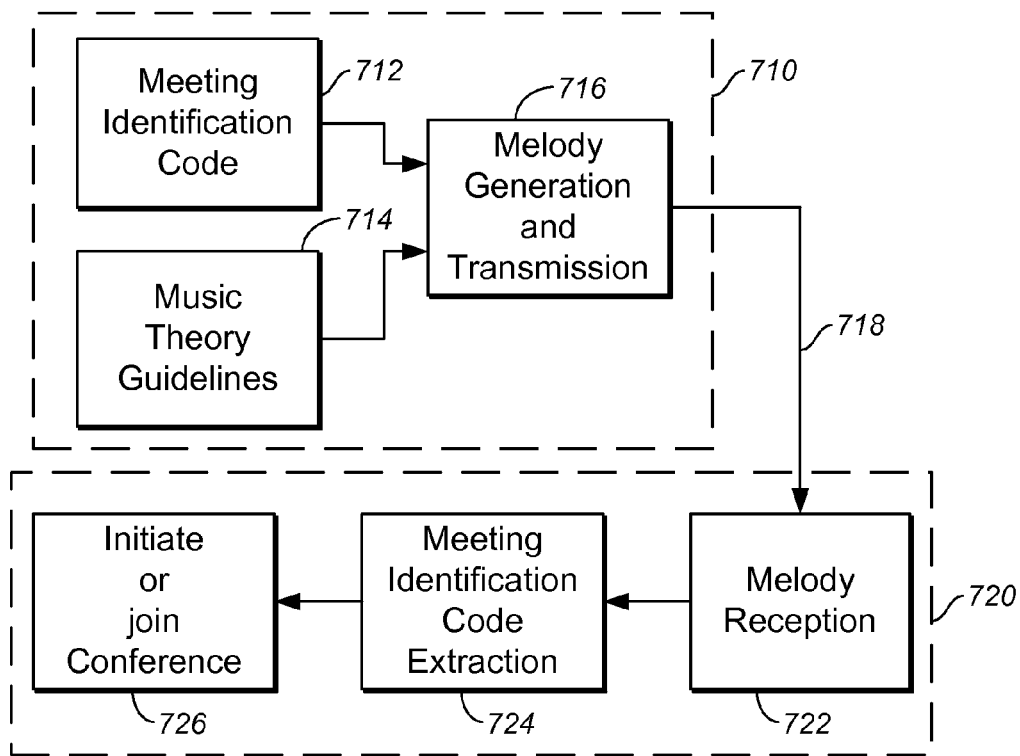
FIG. 7 depicts another embodiment of a conference call initiation as made in accordance with the principles of the present application.

Devices, such as laptops or smartphones, brought into a meeting room may be set to a mode which listens to music transmitted from a conferencing system, from which they are able to decode the meeting IC. The listening device may decode the IC and then either initiate a conference call or join a conference call by receiving additional information from the conferencing system. In an embodiment, the audible signal comprises computer generated music generated by a transmitting device 710. The generated music includes also a meeting IC which is embedded in the melody and structure of the musical piece. As depicted in FIG. 7, the musical piece (718) is created by feeding the meeting IC (712) into a melody generation algorithm (716) which, guided by music theory (714), creates a musical piece or melody whose content includes the meeting IC. The melody may be played through loudspeakers or it may be transmitted through other transmission means (e.g., FM radio or Bluetooth). A receiving device (720), such as a phone, tablet, or laptop, is in 'listening mode' and is able to decode the music and determine the meeting IC (724). The receiving device then may proceed to initiate or join a conference call (726).

In some embodiments, the generated melody 718 may also fit certain musical style or sonic branding (e.g., a distinguished audio logo). Musical style refers to musical phrases which are comprised of musical motives. Motives are the musical equivalent of words in linguistics and are formed of various rhythmic and melodic components. Various transformations of the musical motives in timing and note selection are what form distinctive phrases and hence different styles. Within any style or recognizable motif there exists a space of variations that can be used to robustly encode the suggested hash (e.g., IC) in this application. As such, it is possible to create or iterate a large number of unique and information bearing variations on a recognizable motif, and apply this in different ways. In an embodiment, the music style may also be aligned with a certain sonic branding, typical of many corporate entities. In such an example there would be certain key aspects, such as instrumentation and timing, which are very particular and preserved, whilst allowing variability in melodic or 'framed' sections which permit more improvisation or variability.

An alternative is to center on a particular melody or timing, or a suitable collection of potential melodies, which may be familiar to listeners. In such an example, the instrumentation, timing, and arrangements may change whilst retaining the ability to identify or recall a certain familiar melodic motif, such as a large number (e.g., $2^{32}$) variations of the melody 'When the Saints are Marching In'.

In most corporate environments, computing devices are inter-connected through a computer network that may supports thousands of users. In an embodiment, the generated melody (718) comprises a unique hash key (binary code) that is sufficient to provide a unique identification and authentication. Since the time intervals for play and listening requests can always be known by a central server, the time window in which play and response occurs is also an additional aspect of security and uniqueness. Additionally, some knowledge of coarse IP localization can be used for added security. Hence, such hash keys can provide a sufficiently unique code to identify a meeting or a conferencing device with a high security factor in a healthy global deployment. Hash keys can also be heavily recycled.

In an example embodiment, such a "music seed" (or hash key) may comprise of a 32-bit number with fields as depicted in Table 1:

TABLE 1

Example fields for a music seed

| Number of Bits | Parameter | Description |
| --- | --- | --- |
| 3 | Music key | A, Ab, B, C, Db, D, Eb, E |
| 2 | Scale | Major, Minor, Diminished, Major Blues |
| 3 | Tempo | Beats per minute |
| 12 | Motif | Musical phrase comprising of notes - from table or melody parameterization |
| 2 × 4 | Motif Transformations | Shift up, Shift down, Invert, Change rhythm |
| 4 | Instrumentation | Instrument sounds |

The music can be generated using the randomly generated seed which produces audio with a musical aesthetic. In an embodiment, the musical nature is centered around a musical motif which comprises of various notes in a rhythmic pattern. The selection of notes is determined by the music key and the scale, while the tempo determines the speed of the piece. Each motif is then transformed 4 times to produce variations of the motif. The instrument sounds are selected from a number of synthesis engines.

On the receiving device, in an embodiment, a decoder analyses audio segments in the time and frequency domains to determine the music key, scale, tempo, and motif parameters. It then can determine the transformations of the motif and the instrumentation used, thus extracting the complete music seed or hash key.

Figure 8:
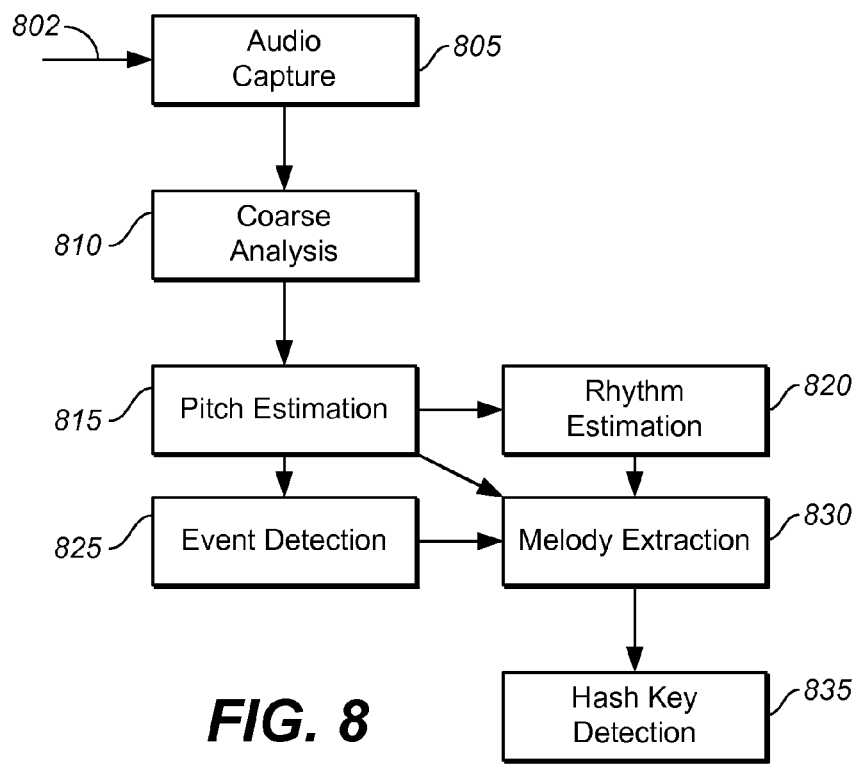
FIG. 8 depicts an example audio decoder and hash key detector according to an embodiment of the present application.

FIG. 8 depicts an example processing data flow for retrieving the transmitted identification code according to an embodiment. Transmitted audio 802 may be captured through a listening's device microphone or other means (e.g., a radio antenna or Bluetooth receiver). There is a large body of work related to transcribing melodies for received audio. Examples of work related to music transcription may be found in "*Musical Instrument Sound Source Separation*," by D. Gunawan, Ph. D. Thesis, The University of New South Wales, 2009, and in "Signal Processing Methods for the Automatic Transcription of Music," by A. Klapuri, Ph.D. Thesis, Tampere University of Technology, 2004, incorporated herein by reference. In an embodiment, the captured audio is first processed through a first-stage meeting ID code identifier (810), which analyses the harmonic nature of the audio using a coarse analysis of lower computational complexity in order to segment a potential region for full code analysis. Once an appropriate region of the audio stream has been identified, the audio is windowed and the pitch is estimated for each window (815). A rhythm analysis (820) also determines the appropriate meter of the audio segment. Using the pitch, events are detected (825) and the melody is extracted (830). The estimated melody is then put through a robust hash detector (835) which performs both standard error checking and also checks for errors across melodic constraints. The extracted hash key and additional information (such as the IP of the listening device or a request to initiate or join a conference) are then sent back to a server or the conferencing system. The use of MD5 (Message Digest Algorithm) for digital music is an example of how audio can be converted into a hash key. Additionally, there has been related work in audio fingerprinting and audio watermarking.

Robust hash detection against acoustic interferers can be improved by applying additional optional design features when creating the melody or extracting the hash key. For example, detection can be improved when using instruments or sounds that contain unique spectral signatures (e.g. bells). During error checking in hash detection, one may also take into consideration that the melodic composition, since it is derived from a specific set of musical rules, it also has a limited set of probabilistic combinations. Finally, repetition, which is very common in music, may also be exploited to provide further error checking.

Figure 9:
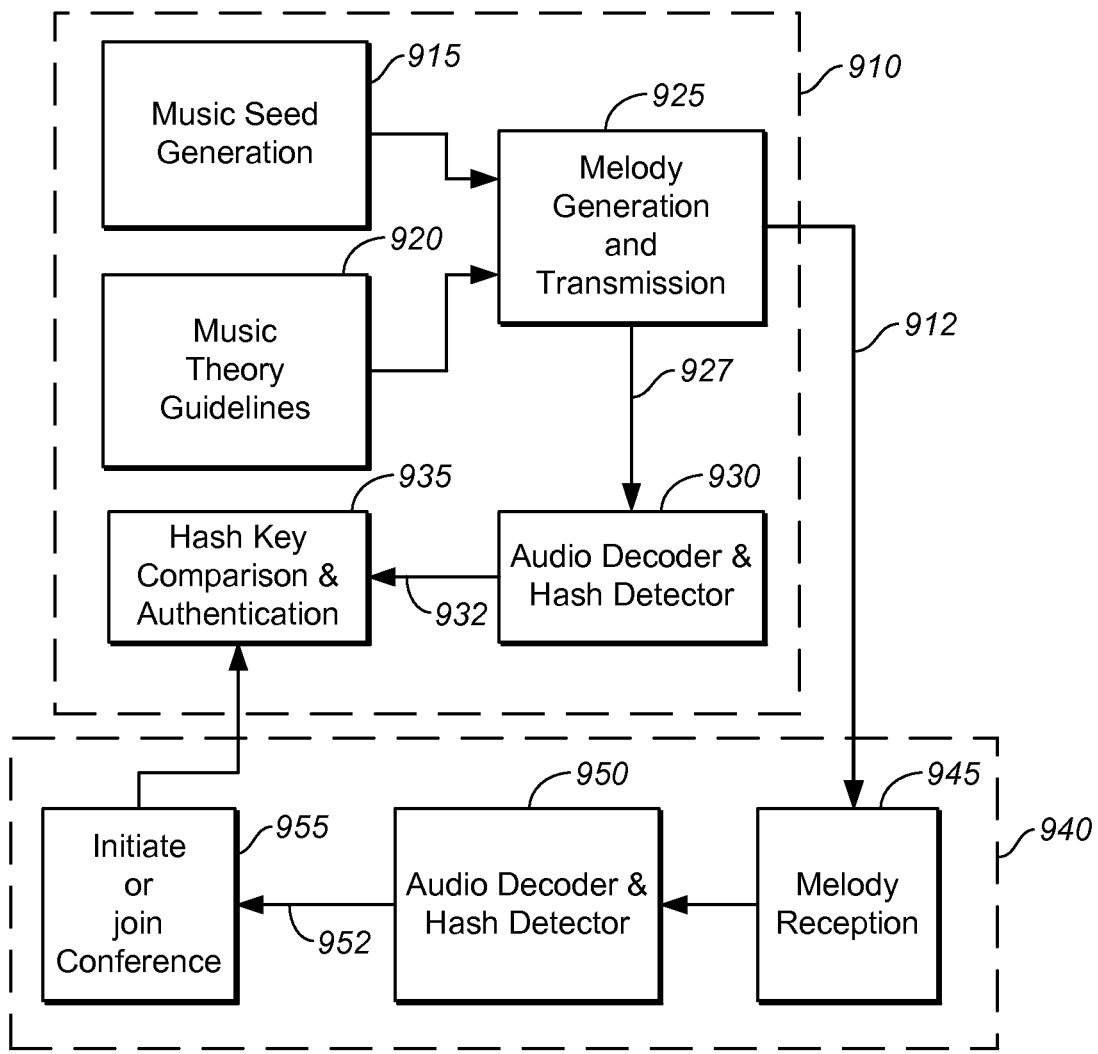
FIG. 9 depicts another embodiment of a call initiation as made in accordance with the principles of the present application.

FIG. 9 depicts another example embodiment for call initiation using a hash key embedded in an audio signal. As depicted in FIG. 9, a first device (910) may generate and transmit a melody (912) based on a music seed (915) and music theory guidelines (920). The music seed may be generated by the device itself or by a separate conference server. Upon generating the melody (927), the first device may use an audio decoder and hash detector (930) to extract a first decoded hash key (932), which may be used as part of the conference identification code. The decoding and hash detection algorithm may be similar to the one depicted in FIG. 8 or it may be any other algorithm that may generate a hash key from an audio file. In certain embodiments, the hash key detection algorithm (930) may take into consideration expected perturbations into to the audio signal (e.g., sample skew, noise, filtering, and the like) to generate a range of possible hash keys. In a second device (940), upon receiving the audio melody (912), another decoder and hash detector (950) may also extract a second hash key (952) from the audio file. In order to join or initiate a conference, the second device may transmit the second hash key (952) back to the first device (910). The first device may initiate a hash key comparison (935) and upon determining that the received hash key (952) matches one of the locally generated hash keys (932), it may allow the second device to initiate or join the conference.

In some embodiments, parts of the hash key extraction (930 and 950) and hash key comparison (935) operations may be processed by a remote server (not shown). In some embodiments, the first device (910) may be a conferencing system or a conferencing server and the second device (940) may be a controlling device. In some other embodiment, the first device (910) may be the controlling device and the second device (940) may be the conferencing system.

Aesthetic audio signaling may be used in a variety of alternative embodiments. For example, a controlling device, such as a smartphone, may upon a user's request play a unique chime A conferencing system may be constantly monitoring the audio in a meeting room. By capturing a signature block of audio, decoding it to a hash key, and sending the hash key to a server, the CS may be able to receive from the server a conference ID and authorization to join the conference.

The decoding of the hash key may also be distributed across multiple devices. Most devices may simply incorporate only a low-complexity audio monitor. After the coarse analysis step (805), which may identify an audio segment that may include an identification code, the relevant segments may be sent for detailed analysis to a remote server. The server then performs the remaining of the analysis. Upon detecting a valid key, the server may either return it to the sender or it may utilize it directly to perform a desired task, such as allowing the remote device to join or initiate a conference, or control other aspects of the conference.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method comprising:
    initiating, by a conference device, an ultrasound broadcast signal within proximity to an external device to establish a communication pathway between said conference device and said external device;
    generating and transmitting to said external device, by said conference device, a pilot sequence for synchronizing said communication pathway between said conference device and said external device; and
    receiving, by said conference device, conference information from said external device, said conference device using said conference information to initiate a conference call to a plurality of external devices;
    wherein said method further comprises the step of generating an acoustic signature;
    wherein the step of generating an acoustic signature further comprises the steps of:
        generating said pilot sequence;
        pulse shaping said pilot sequence;
        coding a data bit stream;
        pulse shaping said data bit stream;
        appending said pilot sequence at the beginning of a transmission;
        modulating said appended bit stream with an ultrasonic carrier frequency; and
        transmitting said modulated bit stream.

2. The method as recited in claim 1, wherein said conference information comprises an address regarding said conference call.

3. The method as recited in claim 1, wherein said ultrasound broadcast signal further comprises an IP address of said conferencing device.

4. The method as recited in claim 1, wherein said communication pathway comprises one or more of acoustic communications, Bluetooth communications, WiFi communications, or Near Field Communications (NFC).

5. The method as recited in claim 1, wherein said communication pathway uses an ultrasonic acoustic band.

6. The method as recited in claim 1, wherein said conference device comprises a transceiver, for transmitting the ultrasonic broadcast signal, as an integral unit.

7. The method as recited in claim 1, wherein said conference device is a unit separate from a transceiver for transmitting the ultrasonic broadcast signal.

8. A non-transitory computer readable storage medium, said computer readable storage medium having computer-executable instructions stored thereon that, when executed by a processor, cause said processor to execute the steps of a method comprising:
    initiating, by a conference device, an ultrasound broadcast signal within proximity to an external device to establish a communication pathway between said conference device and said external device;
    generating and transmitting to said external device, by said conference device, a pilot sequence for synchronizing said communication pathway between said conference device and said external device; and
    receiving, by said conference device, conference information from said external device, said conference device using said conference information to initiate a conference call to a plurality of external devices;
wherein said method further comprises the step of generating an acoustic signature;
wherein the step of generating an acoustic signature further comprises the steps of:
generating said pilot sequence;
pulse shaping said pilot sequence;
coding a data bit stream;
pulse shaping said data bit stream;
appending said pilot sequence at the beginning of a transmission;
modulating said appended bit stream with an ultrasonic carrier frequency; and
transmitting said modulated bit stream.

9. The medium as recited in claim 8, wherein said conference device comprises a transceiver, for transmitting the ultrasonic broadcast signal, as an integral unit.

10. The medium as recited in claim 8, wherein said conference device is a unit separate from a transceiver for transmitting the ultrasonic broadcast signal.

11. The medium as recited in claim 8, wherein said conference information comprises an address regarding said conference call.

12. The medium as recited in claim 8, wherein said ultrasound broadcast signal further comprises an IP address of said conferencing device.

13. A method comprising:
receiving, by an external device from a conference device, an ultrasound broadcast signal within proximity to establish a communication pathway between the conference device and the external device;
receiving, by the external device from the conference device, a pilot sequence for synchronizing said communication pathway between the conference device and the external device; and
sending, by the external device, conference information to the conference device to cause the conference device to use the conference information to initiate a conference call to a plurality of external devices;
wherein said pilot sequence is a part of an acoustic signature;
wherein the acoustic signature is generated by the conference device performing the steps of:
generating said pilot sequence;
pulse shaping said pilot sequence;
coding a data bit stream;
pulse shaping said data bit stream;
appending said pilot sequence at the beginning of a transmission;
modulating said appended bit stream with an ultrasonic carrier frequency; and
transmitting said modulated bit stream.

14. The method of claim 13, wherein the pilot sequence is decoded from a pilot signal received by the external device from the conference device.

15. The method of claim 13, wherein the conference information comprises an IP address of the conferencing device.

16. The method of claim 13, wherein the conference information is sent over one or more of: acoustic communications, Bluetooth communications, WiFi communications, or Near Field Communications (NFC).

17. The method of claim 13, wherein the ultrasound broadcast signal is received using a microphone of the external device.

18. A method for inter-changing authentication information between a first conferencing device and a second conferencing device, the method comprising:
accessing with a first processor a meeting identification code;
generating using the first processor an acoustic melody based on the meeting identification code and music theory guidelines;
transmitting the acoustic melody using a transmitter in the first conferencing device;
receiving using a receiver the acoustic melody in the second conferencing device;
computing a second decoded hash key by the second conferencing device based on the received acoustic melody, wherein the second decoded hash key is sent back by the second conferencing device to the first conferencing device;
extracting the meeting identification code by the second conferencing device;
computing a first decoded hash key by the first conferencing device based on the generated acoustic melody;
comparing the first decoded hash key with the second decoded hash key by the first conferencing device to determine whether to allow the second conferencing device to initiate or join the conference;
in response to determining to allow the second conferencing device to initiate or join the conference, initiating or joining a conference using the extracted meeting identification code.

19. The method of claim 18 wherein the acoustic melody further comprises a certain musical style or sonic branding.

20. The method of claim 18 wherein transmitting the acoustic melody comprises playing the acoustic melody through one or more loudspeakers in the first conferencing device.

21. The method of claim 18 wherein the second conferencing device receives the acoustic melody though a microphone.

22. The method of claim 18, wherein extracting the meeting identification code further comprises:
performing a coarse analysis on the received acoustic melody to identify a potential audio segment that may include the meeting identification code;
performing melody extraction on the potential audio segment to extract an output melody; and
applying a hash detection to the output melody to extract the meeting identification code.

23. The method of claim 22, wherein performing melody extraction further comprises performing at least one or more of pitch estimation, rhythm estimation, or event detection on the potential audio segment.

24. The method of claim 18 wherein the first conferencing device comprises a conferencing system and the second conferencing device comprises a controlling device.

25. The method of claim 18 wherein the first conferencing device comprises a controlling device and the second conferencing device comprises a conferencing system.

26. The method of claim 18 wherein generating the acoustic melody based on the meeting identification code and music theory guidelines further comprises:
extracting from the identification code a music seed, the music seed comprising at least one of a music key, a music scale, a music tempo, a music motif, a music motif transformation, or an instrument sound.

27. The method of claim 26, wherein the music seed comprises a 32-bit number.

28. A non-transitory computer readable storage medium, the computer readable storage medium having computer-executable instructions stored thereon that, when executed by a processor, cause the processor to execute the steps of a method comprising:
- receiving, by an external device from a conference device, an ultrasound broadcast signal within proximity to establish a communication pathway between the conference device and the external device;
- receiving, by the external device from the conference device, a pilot sequence for synchronizing said communication pathway between the conference device and the external device; and
- sending, by the external device, conference information to the conference device to cause the conference device to use the conference information to initiate a conference call to a plurality of external devices;
- wherein said pilot sequence is a part of an acoustic signature;
- wherein the acoustic signature is generated by the conference device performing the steps of:
  - generating said pilot sequence;
  - pulse shaping said pilot sequence;
  - coding a data bit stream;
  - pulse shaping said data bit stream;
  - appending said pilot sequence at the beginning of a transmission;
  - modulating said appended bit stream with an ultrasonic carrier frequency; and
  - transmitting said modulated bit stream.

29. The medium of claim 28, wherein the pilot sequence is decoded from a pilot signal received by the external device from the conference device.

30. The medium of claim 28, wherein the conference information comprises an IP address of the conferencing device.

31. The medium of claim 28, wherein the conference information is sent over one or more of: acoustic communications, Bluetooth communications, WiFi communications, or Near Field Communications (NFC).

32. The medium of claim 28, wherein the ultrasound broadcast signal is received using a microphone of the external device.

33. A non-transitory computer readable storage medium, the computer readable storage medium having computer-executable instructions stored thereon that, when executed by a processor, cause the processor to execute the steps of a method for inter-changing authentication information between a first conferencing device and a second conferencing device comprising:
- accessing with a first processor a meeting identification code;
- generating using the first processor an acoustic melody based on the meeting identification code and music theory guidelines;
- transmitting the acoustic melody using a transmitter in the first conferencing device;
- receiving using a receiver the acoustic melody in the second conferencing device;
- computing a second decoded hash key by the second conferencing device based on the received acoustic melody, wherein the second decoded hash key is sent back by the second conferencing device to the first conferencing device;
- extracting the meeting identification code by the second conferencing device;
- computing a first decoded hash key by the first conferencing device based on the generated acoustic melody;
- comparing the first decoded hash key with the second decoded hash key by the first conferencing device to determine whether to allow the second conferencing device to initiate or join the conference;
- in response to determining to allow the second conferencing device to initiate or join the conference, initiating or joining a conference using the extracted meeting identification code.

34. The medium of claim 33, wherein the acoustic melody further comprises a certain musical style or sonic branding.

35. The medium of claim 33, wherein transmitting the acoustic melody comprises playing the acoustic melody through one or more loudspeakers in the first conferencing device.

36. The medium of claim 33, wherein the second conferencing device receives the acoustic melody though a microphone.

37. The medium of claim 33, wherein extracting the meeting identification code further comprises:
- performing a coarse analysis on the received acoustic melody to identify a potential audio segment that may include the meeting identification code;
- performing melody extraction on the potential audio segment to extract an output melody; and
- applying a hash detection to the output melody to extract the meeting identification code.

38. The medium of claim 37, wherein performing melody extraction further comprises performing at least one or more of pitch estimation, rhythm estimation, or event detection on the potential audio segment.

39. The medium of claim 33, wherein the first conferencing device comprises a conferencing system and the second conferencing device comprises a controlling device.

40. The medium of claim 33, wherein the first conferencing device comprises a controlling device and the second conferencing device comprises a conferencing system.

41. The medium of claim 33, wherein generating the acoustic melody based on the meeting identification code and music theory guidelines further comprises:
- extracting from the identification code a music seed, the music seed comprising at least one of a music key, a music scale, a music tempo, a music motif, a music motif transformation, or an instrument sound.

42. The medium of claim 41, wherein the music seed comprises a 32-bit number.

* * * * *